(12) United States Patent
Arendt et al.

(10) Patent No.: US 8,465,242 B2
(45) Date of Patent: Jun. 18, 2013

(54) FASTENER FOR STRUT CHANNEL

(75) Inventors: Scott P. Arendt, APO (AF); Rodolfo Jesus Bernal, Fredericksburg, VA (US); Vladimir Fabian, Arlington, VA (US); Thomas E. Jean, Hague, VA (US); Carl S. Lynn, IV, Fredericksburg, VA (US); Kevin G. Smith, King George, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 261 days.

(21) Appl. No.: 12/930,166

(22) Filed: Dec. 8, 2010

(65) Prior Publication Data

US 2012/0315106 A1      Dec. 13, 2012

(51) Int. Cl.
 *F16B 21/04* (2006.01)

(52) U.S. Cl.
 USPC ............................................. 411/551; 411/85

(58) Field of Classification Search
 USPC .......... 411/84, 85, 349, 549–553; 248/221.11
 See application file for complete search history.

(56) References Cited

U.S. PATENT DOCUMENTS

| | | | | |
|---|---|---|---|---|
| 1,306,100 A | * | 6/1919 | Chadwick | 411/368 |
| 3,664,434 A | * | 5/1972 | Connor et al. | 172/536 |
| 5,044,856 A | * | 9/1991 | Jerabek | 411/551 |
| 5,370,488 A | * | 12/1994 | Sykes | 411/551 |
| 5,413,392 A | * | 5/1995 | Schlack et al. | 292/204 |
| 5,433,550 A | * | 7/1995 | Huber | 403/348 |
| 5,694,729 A | | 12/1997 | Blackburn et al. | 52/582.2 |
| 5,794,901 A | * | 8/1998 | Sigel | 248/221.11 |
| 6,070,334 A | | 6/2000 | Pretsch, Jr. | 33/474 |
| 6,336,766 B1 | * | 1/2002 | De Villele | 403/348 |
| 6,729,629 B2 | | 5/2004 | Chi | 280/11.27 |
| RE39,582 E | | 4/2007 | Luhm | 411/43 |
| 7,290,313 B2 | | 11/2007 | Southern | 24/614 |
| 7,387,284 B2 | | 6/2008 | Chang | 248/206.5 |
| 7,621,487 B2 | | 11/2009 | Brown et al. | 248/65 |
| 7,874,774 B2 | * | 1/2011 | Peterson | 410/104 |
| 7,976,256 B2 | * | 7/2011 | Womack et al. | 410/105 |
| 2005/0036848 A1 | * | 2/2005 | Cunningham et al. | 410/104 |

\* cited by examiner

*Primary Examiner* — Flemming Saether
(74) *Attorney, Agent, or Firm* — Gerhard W. Theilman, Esq.

(57) ABSTRACT

A self-contained fastener is provided for attaching to a structure having opposing edges that flank a cavity across a gap. The fastener includes a grip member, a clamp member and a latch member. The grip member has a knob and an inner annulus disposed thereon along an axis of symmetry. The knob has a central through-hole coaxial with the inner annulus. The inner annulus has an arc tab that radially protrudes therefrom. The clamp member includes a boss and an outer annulus disposed thereon. The boss has first and second dimensions perpendicular to the axis, the first dimension being shorter than the gap. The clamp member is flanked by opposing ledges along the second dimension. Each ledge is arranged to engage a respective edge of the structure. The inner annulus is coaxially insertable into the outer annulus. The latch member includes a stud and a flange. The stud is insertable at a proximal end into the inner annulus and the through-hole. The flange is disposed at a distal end of the stud and has a third dimension shorter than the gap. The flange and the block can be inserted into the cavity along the respective third and first dimensions through the gap. In response to clockwise turning, the knob rotates the tab within the angular notch until inhibited by the outer annulus, whereby the proximal end of the stud retracts into the through-hole, thereby engaging the fastener to the structure.

17 Claims, 6 Drawing Sheets

FASTENER FOR STRUT CHANNEL

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to fasteners for strut channels. In particular, the invention relates to self-contained fasteners for attaching and detaching components to strut channels without tools.

Universal mounting rails are utilized in a variety of applications. Generically referred to as "strut channels", these can be available in multiple shapes and sizes. They are traditionally found within buildings and industrial complexes, often behind the scenes in service and maintenance corridors.

An emerging use for the channel is for load/equipment fastening for ground vehicles, both in the civilian and military sector. They provide a strong, simple, and cost-effective mounting methodology that allows for flexibility when attaching components, sensors, peripherals, and any other equipment that needs to be attached either in the interior or on the exterior of a vehicle.

Several techniques currently exist for attaching components to these universal mounting rails. Many of the conventional devices are tailored to a specific function or require the use of hand tools to install or remove. In many cases, a strut-channel nut is placed in the channel, with the component to be attached aligned with a coaxial hole to the nut, and then a fastening bolt inserted through the hole and tightened at the nut.

While simple and effective, such conventional devices typically require multiple separate pieces to be set up in a specific order before tightening, and can be cumbersome as well as time consuming. More importantly, in almost all cases, tools are required to tighten down the fasteners. Consequently, the conventional methods are difficult to use in an outdoor or military environment where tools and supplies are limited and installation time is an important operational consideration.

SUMMARY

Conventional channel fasteners yield disadvantages addressed by various exemplary embodiments of the present invention. In particular, various exemplary embodiments provide a self-contained fastener for attaching to a structure having opposing edges that flank a cavity across a gap.

For these embodiments, the fastener includes a grip member, a clamp member and a latch member. In various exemplary embodiments, the grip member has a knob and an inner annulus disposed thereon along an axis of symmetry. The knob has a central through-hole coaxial with the inner annulus. The inner annulus has an arc tab that radially protrudes therefrom.

In further embodiments, the clamp member includes a boss and an outer annulus disposed thereon. The boss has first and second dimensions perpendicular to the axis, the first dimension being shorter than the gap. The clamp member is flanked by opposing ledges along the second dimension. Each ledge is arranged to engage a respective edge of the structure. The inner annulus is coaxially insertable into the outer annulus.

In further embodiments, the latch member includes a stud and a flange. The stud is insertable at a proximal end into the inner annulus and the through-hole. The flange is disposed at a distal end of the stud and has a third dimension shorter than the gap. The flange and the block can be inserted into the cavity along the respective third and first dimensions through the gap. In response to clockwise turning, the knob rotates the tab within the angular notch until inhibited by the outer annulus, whereby the proximal end of the stud retracts into the through-hole, thereby engaging the fastener to the structure.

In alternate embodiments, the fastener further includes a cap member that engages the knob. The cap member includes a locking mechanism for securing the clamp member. In additional embodiments, the through-hole includes a flat wall parallel to the axis, the stud has a truncation surface at the proximal end, and the truncation surface engages the wall in response to retraction of the stud into the through-hole.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Various exemplary embodiments provide a self-contained strut channel component fastener that enables components to be mounted to a universal style mounting rail, such as a strut channel. In particular, the fastener described herein can be installed and detached using only one hand, and without tools, such as for alignment or application of torque.

For military vehicles, techniques are needed to attach equipment and/or components to the exterior of a vehicle rapidly. This should be accomplished without tools beyond a human hand. Moreover, such attachment should preferably resist accidental loosening due to abrasion by the environment and vibration.

Figure 1:
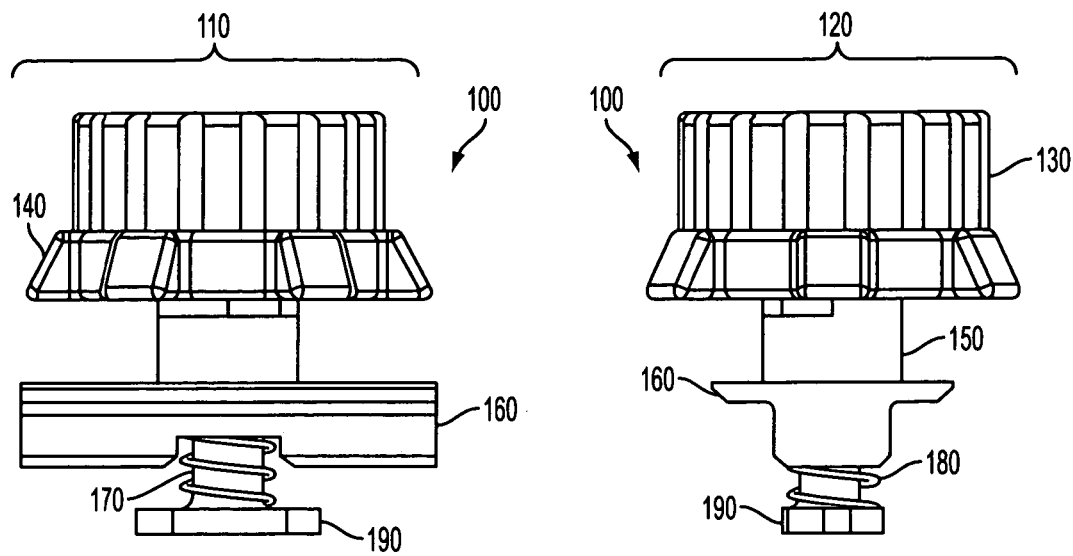
FIG. 1 is an isometric assembly view of a strut fastener.

FIG. 1 shows elevation assembly views of a self-contained strut channel component fastener 100. In particular, the strut fastener 100 is depicted in the uncompressed configuration. The elevation views 110 and 120 provide perspectives perpendicular from one another, as observed from the side. An upper cinch knob or cap 130 is disposed above a lower torque knob or grip 140. The grip 140 connects to an outer key-annulus 150. A twist clamp 160 engages the key-annulus 150. An inner shaft or stud 170 with a helical spring 180 inserts from below through the clamp 160 and the key-annulus 150, terminating at a flange 190 on the bottom.

Figure 2:
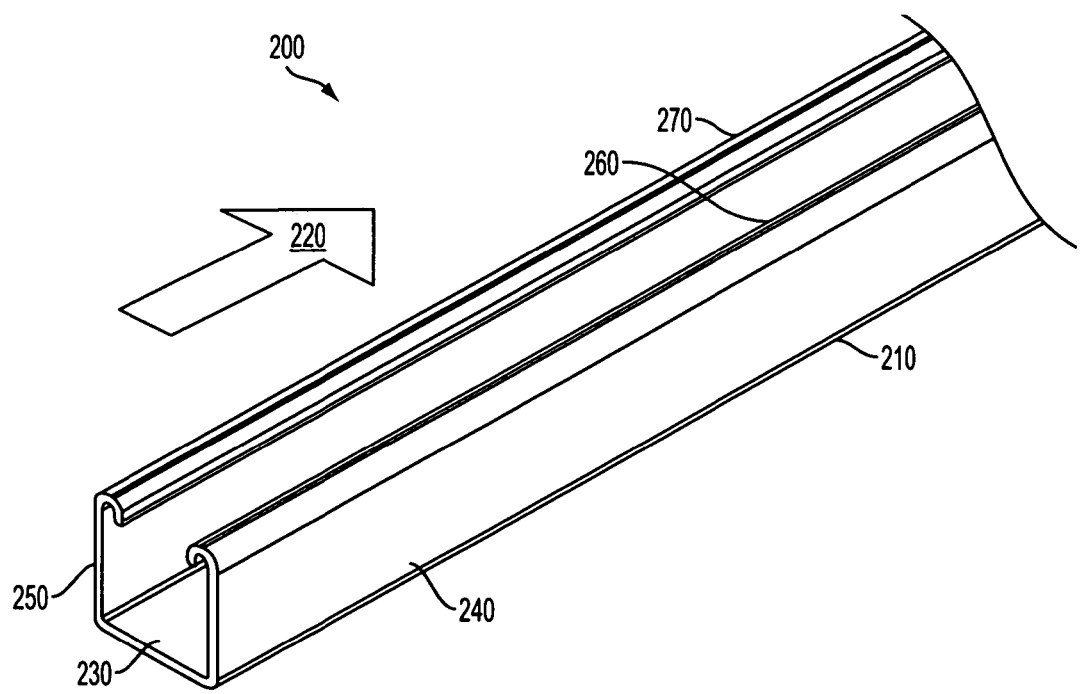
FIG. 2 is an isometric assembly view of a channel strut.

FIG. 2 shows an isometric view 200 of a common channel or strut 210 that extends in a longitudinal direction 220 as a rail. In particular, such a strut can be exemplified by a 1⅝ inch wide 12-gauge channel by UNISTRUT® of Wayne, Mich., as available in the UC-139 pricebook at page 4 (item P1000). See http://www.unistrut.us/news/UC139.pdf.

The strut 210 includes a channel floor 230 flanked by a right wall 240 and a left wall 250. The upper portions of the walls 240, 250 respectively terminate with curve-cross-section inverted-J lips that project inward. The right wall 240 terminates in a right lip 270, and the left wall 250 terminates in a left lip 280. Components to be mounted to the strut 210 can clamp to the lips 270, 280.

The strut channel component fastener 100 can be utilized in different manners. For example, the fastener 100 can be used to attach a variety of components or equipment, mounted to plates, to universal mounting rails. The fastener 100 can be used singularly to attach at one point to a single rail, multiple points to attach to a single rail, or multiple points to span between two rails. Different methods of mounting to rails using strut channel component fasteners.

Figure 3:
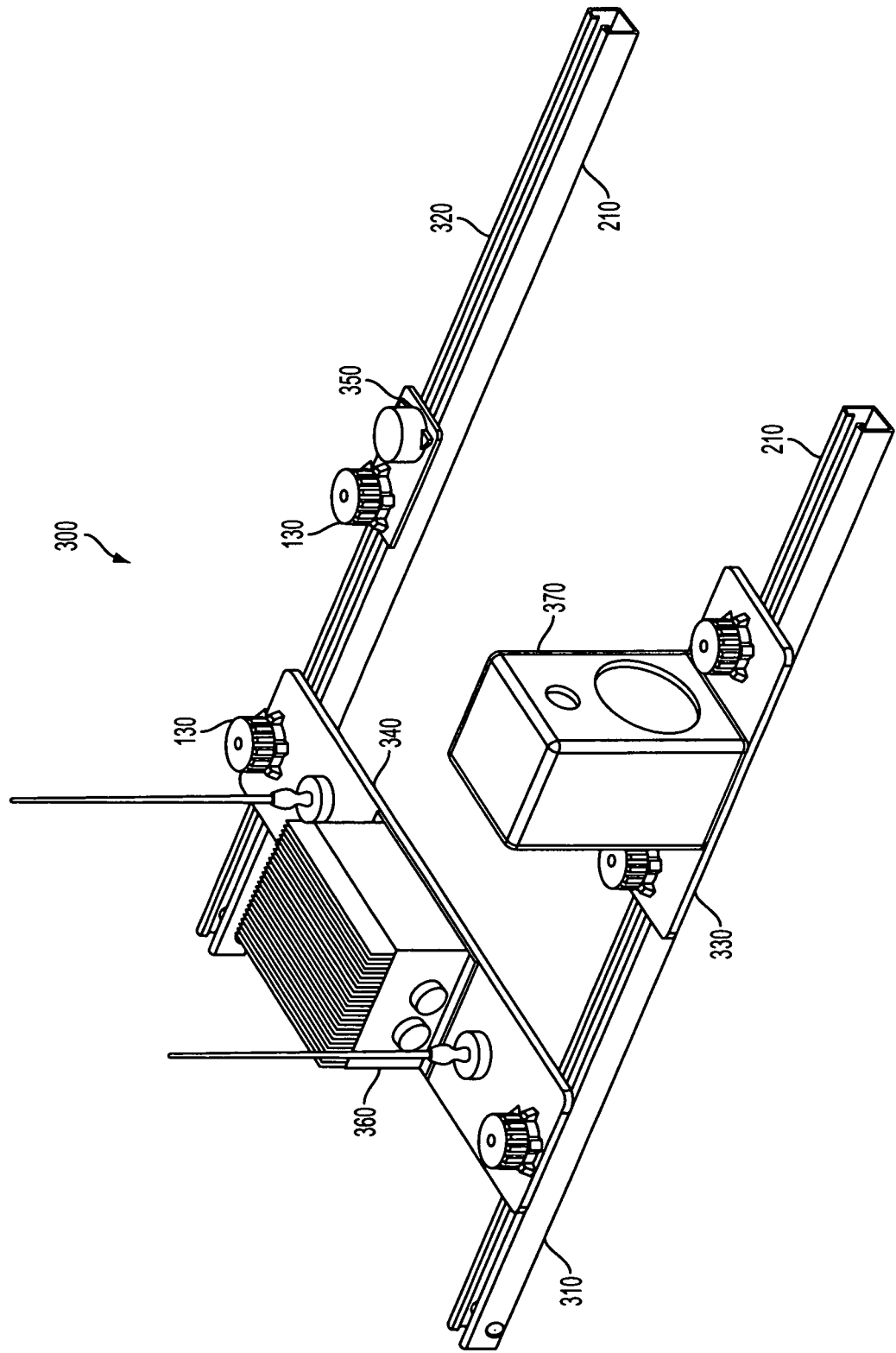
FIG. 3 is an isometric assembly view of a component assembly.

FIG. 3 shows an isometric view 300 of a pair of struts 210 aligned in parallel to form starboard and port rails 310 and 320. A proximal platform 330 mounts to the starboard rail 310. A bridge platform 340 spans across both rails 310, 320. A distal platform 350 mounts to the port rail 320. A transmitter 360 with power supply and antennae attaches to the bridge platform 340. An audio speaker 370 attaches to the proximal platform 330.

The entire strut fastener 100 can be contained in a single unit for installing to the components 360 and 370 to be mounted. This integral construction prevents the fastener 100, or portions thereof, from being lost or dropped. The design also simplifies alignment with the strut 210, reducing the time required to install the components 360 and 370. Additionally, the construction and operation of the fastener 100 is also such to enable installation in the middle of the strut 210, negating the need to slide the fastener 100 along the rail in the longitudinal direction 220 to its desired position.

Figure 4:
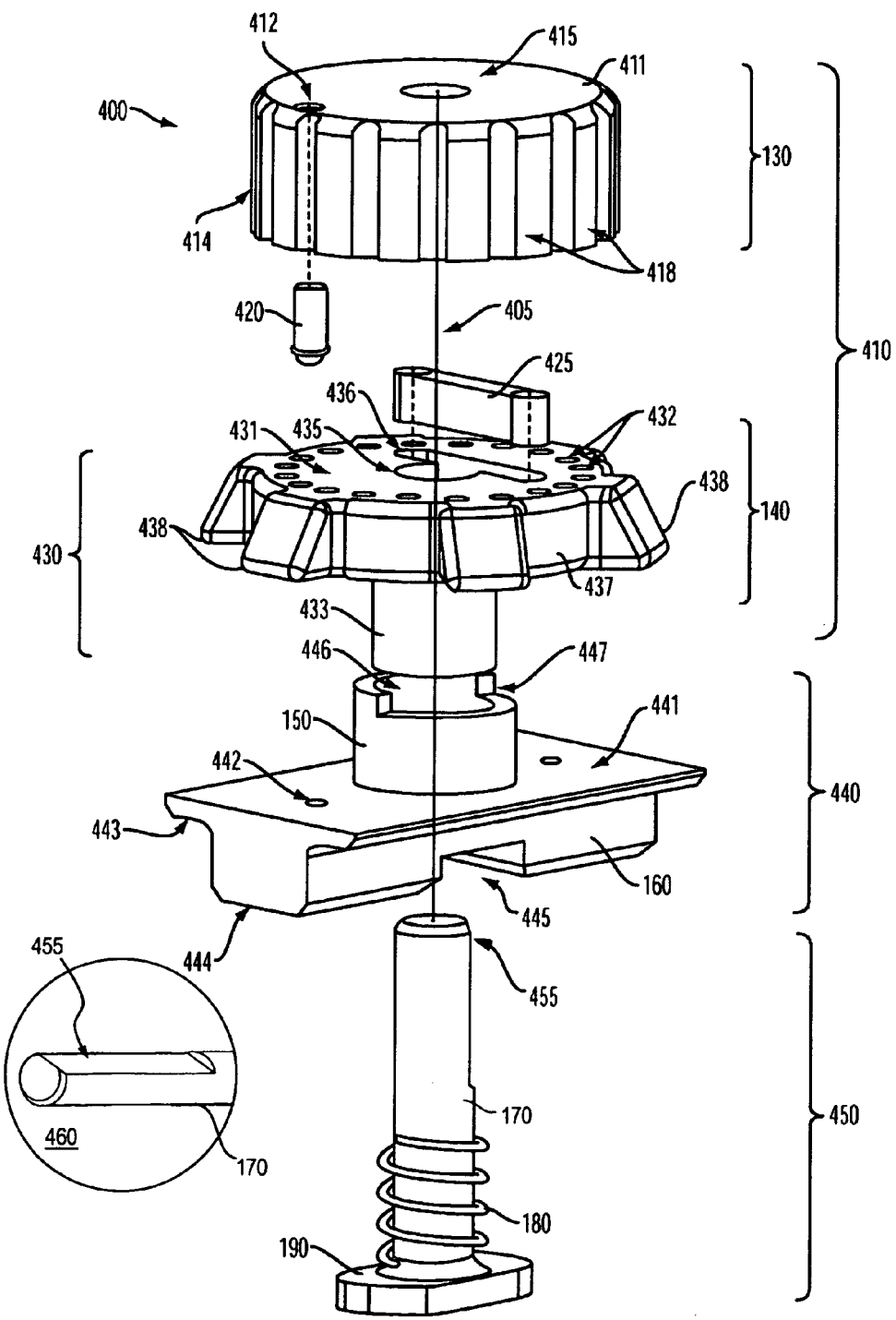
FIG. 4 is an isometric exploded view of the strut fastener.

FIG. 4 shows an isometric exploded view 400 of the fastener 100. The construction of the fastener 100 includes multiple pieces aligned substantially along an axis of symmetry 405. A knob assembly 410 includes the cap 130, the grip 140 and the key-annulus 150. The cap 130 includes a top surface 411 having a peripheral orifice 412 near the radial edge that forms a cylindrical boundary 414.

The surface 411 also includes a central orifice 416 aligned along the symmetry axis 405. The boundary 414 includes grooves 418 parallel to the axis 405 that facilitate manipulation by hand. A spring-plunger ball detent 420 inserts into the cap 130 through the peripheral orifice 412. A stop insert 425 inhibits rotation of the knob assembly 410 beyond a specific limit.

A lower knob assembly 430 includes the grip 140 having an upper surface 431 along which is a plurality of peripheral cavities 432, which all have equidistant radii from the axis 405 as the cap's peripheral orifice 412. An annular shaft 433 descends from the grip 140 along the axis 405. The upper surface 431 also includes a central orifice 435 along the axis 405 and a linear slot orifice 436 adjacent to the central orifice 435.

The stop insert 425 can be disposed into the slot orifice 436 to provide a flat surface within the central orifice 435. The grip 140 has an outer cylindrical rim 437 with ridges or wings 438 that radially protrude therefrom to facilitate manipulation by hand. Artisans of ordinary skill will recognize that alternate finger-grasping surfaces besides grooves 418 and wings 438 can be employed without departing from the scope of the invention.

A base assembly 440 includes the clamp 160 and the key-annulus 150. The clamp 160 includes a platform with an upper surface 441 having a pair of peripheral orifices 442 that are radially equidistant from the axis 405 as the counterpart orifice 412 and cavities 432. The clamp 160 also includes lower ledges 443 that flank a boss 444 that extends underneath the platform with a linear notch 445 in the center. The detent 420 inserted in the orifice 412 can halt at any of the cavities 432. The boss 444 has length and width that may differ, the width being sufficiently short to insert between the channel lips 260 and 270. The length is preferably sufficiently long to enable adequate contact by the ledges 443 to the lips 260 and 270.

The key-annulus 150 opens to an axial cavity 446, with its distal end opposite the linear notch 445 having a longitudinally incision that extends angularly by substantially 180° (or π radians) to form an angular notch 447. A latch assembly 450 includes the stud 170 with its coaxial spring 180 and terminating flange 190 at the stud's distal end to axially restrain the spring 180.

At the stud's proximate end opposite the flange 190, the stud 170 exhibits a flat (or spiral) surface 455 (obscured by the cylindrical portion) that incises across a portion of radial circumference. An insert 460 separately shows the surface 455 on a proximal portion of the stud 170. The base assembly 440 attaches to the strut 210 at the lips 260 and 270, as described subsequently. The annular shaft 433 inserts into the cavity 446, enabling the lower knob assembly 430 to rotate 90° (or ½π radians) to engage and disengage with the strut 210.

Figure 5:
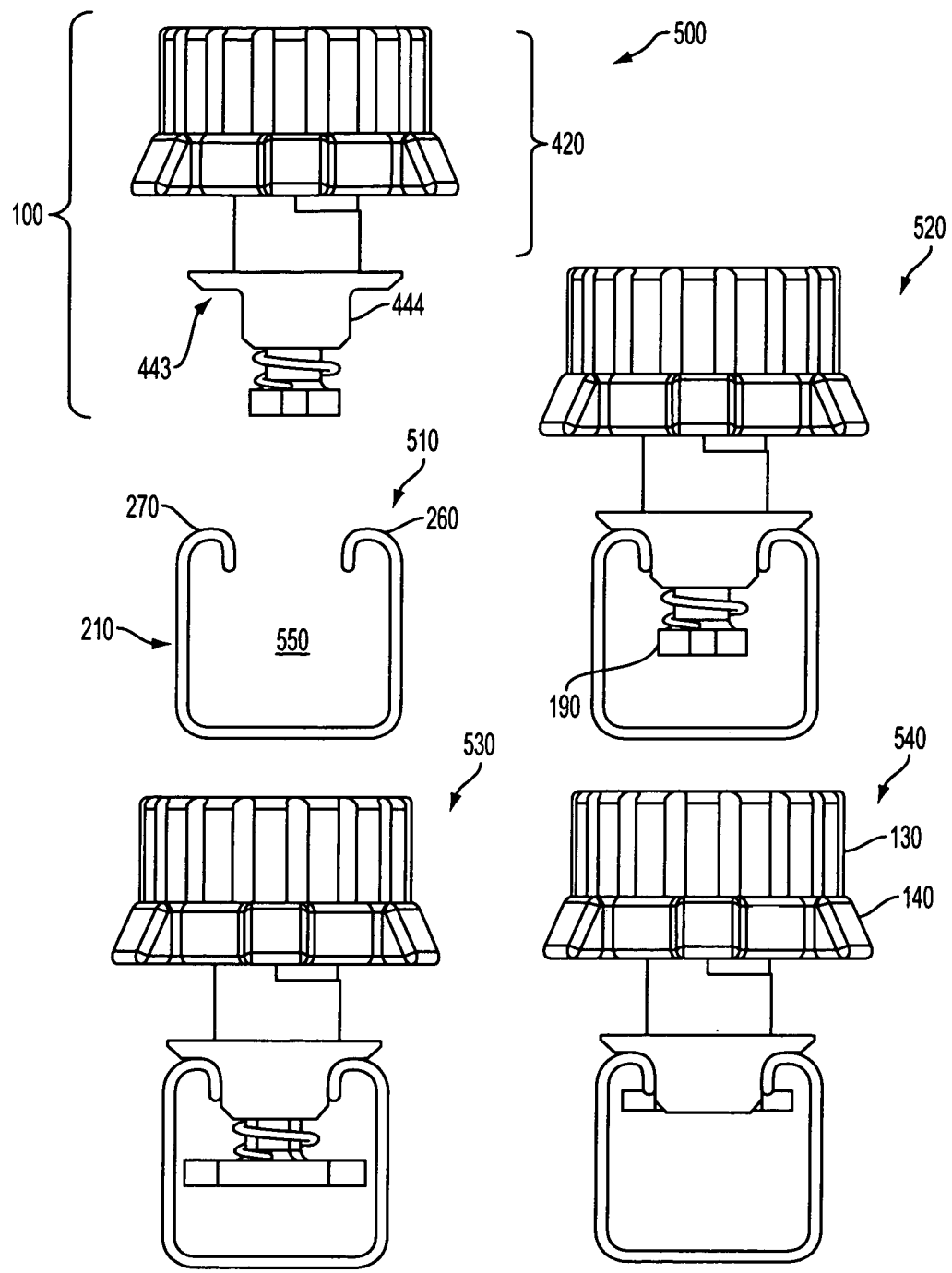
FIG. 5 is an elevation assembly view of a fastener insertion process into the strut.

FIG. 5 shows elevation views 500 for installation of the fastener 100 in the strut 210. The first installation view 510 shows the fastener 100 above the strut 210 prior to insertion with its clamp 160 aligned longitudinally along the rail direction 220 as shown in elevation view 120. The second installation view 520 shows the fastener 100 having the boss 444 and the latch assembly 450 inserted from above into the strut 210, with the lower ledge 443 resting on the lips 260 and 270.

The third installation view 530 shows the flange 190 turned substantially perpendicular to the rail direction 220 as shown in elevation view 110. The fourth installation view 540 shows the stud 170 having been raised through the cavity 446 into the shaft 433. The rail walls 240, 250 and the floor 230 form a longitudinal channel cavity 550 into which the boss 444 and the latch assembly 450 can be inserted.

After insertion of the flange 190 and the boss 444 into the channel cavity 550, as shown in the second installation view 520, the grip 140 can then be rotated 90° clockwise to the locking position. This rotation retrieves the stud 170 to tighten the spring 180 and insert the flange 190 into the linear notch 445.

The cap 130 can then be tightened by turning in a clockwise direction until cinched, and the fastener 100 is secured to avoid to sliding on along the strut 210. Artisans of ordinary skill in the art will recognize that the channel configuration of the strut 210 is merely exemplary and not limiting to the fastener 100 that can be configured for a structure having a cavity 550 flanked by opposing ledges, such as lips 260 and 270.

The spring-loaded ball on the detent 420 engages one of the cavities 432 on the upper surface 431 of the grip 140 that provide stop points for the detent 420. These cavities 432 prevent accidental rotation of the cap 130 that could otherwise loosen the fastener 100. Removal of the fastener 100 entails opposite operational steps of installation using counter-clockwise rotations.

Figure 6:
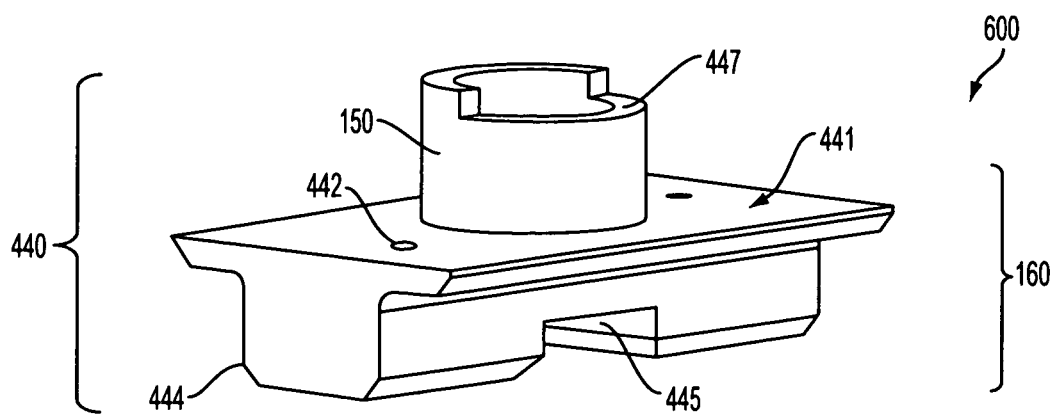
FIG. 6 is an isometric component view of the base clamp assembly.
Figure 7:
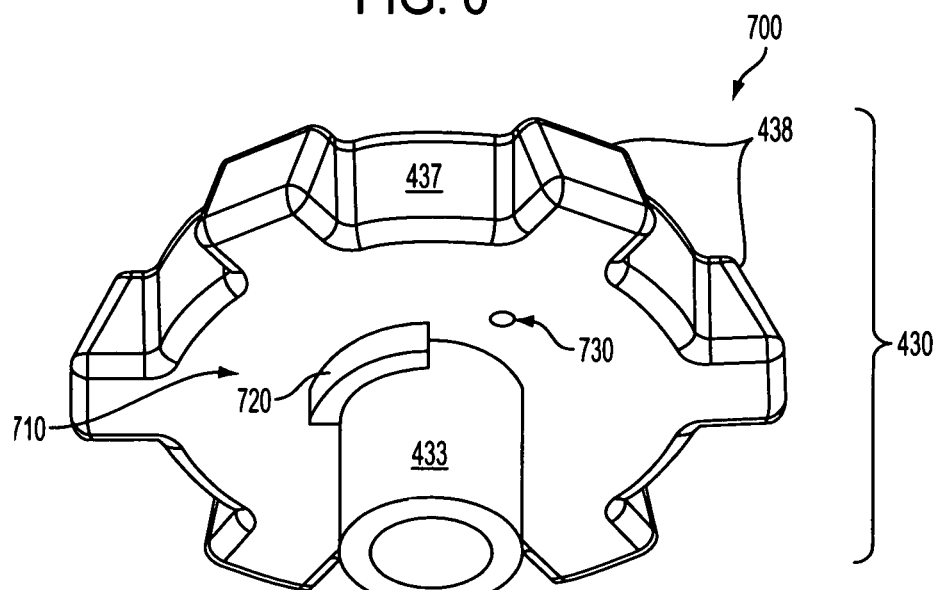
FIGS. 7 and 8 are isometric component views of the grip assembly.

FIG. 6 shows an isometric view 600 of the base assembly 440 with the key-annulus 150 and the clamp 160. FIG. 7 shows an isometric view 700 of the grip assembly 430, featuring a lower surface 710 below which protrudes an annular key-tab 720 to stop rotation. The tab 720 wraps about 90° around the annular shaft 433, extending a short radial distance to remain within the annular notch 447.

Figure 8:
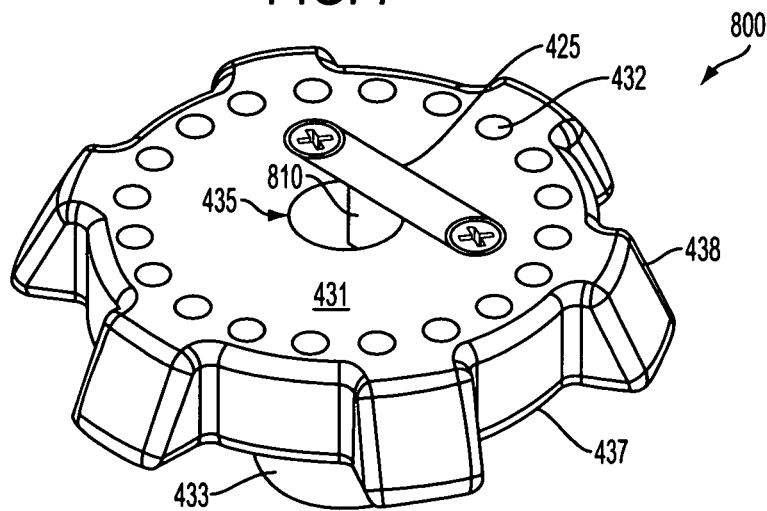

One of the platforms 330, 340 and 350 may be disposed between the lower surface 710 and the lips 260 and 270 for disposal on the strut 210. Internal orifices 730 also extend through the surface 710. FIG. 8 shows another isometric view 800 of the grip assembly 430 showing the stop insert 425 secured within the slot 436. Screws at the longitudinal ends of the stop insert 425 pass through the orifices 730. The stop insert 425 presents a flat surface 810 within the central orifice 435 to provide a rotation restraint.

As the grip 140 turns clockwise, the stud 170 ascends to retract through the annular shaft 433 disposed within the annular cavity 446. Further retraction translates the stud 170 into the central orifice 435 aligning its distal flat or spiral surface 455 to abut against the insert's flat surface 810 and inhibit further rotation of the grip 140.

Figure 9:
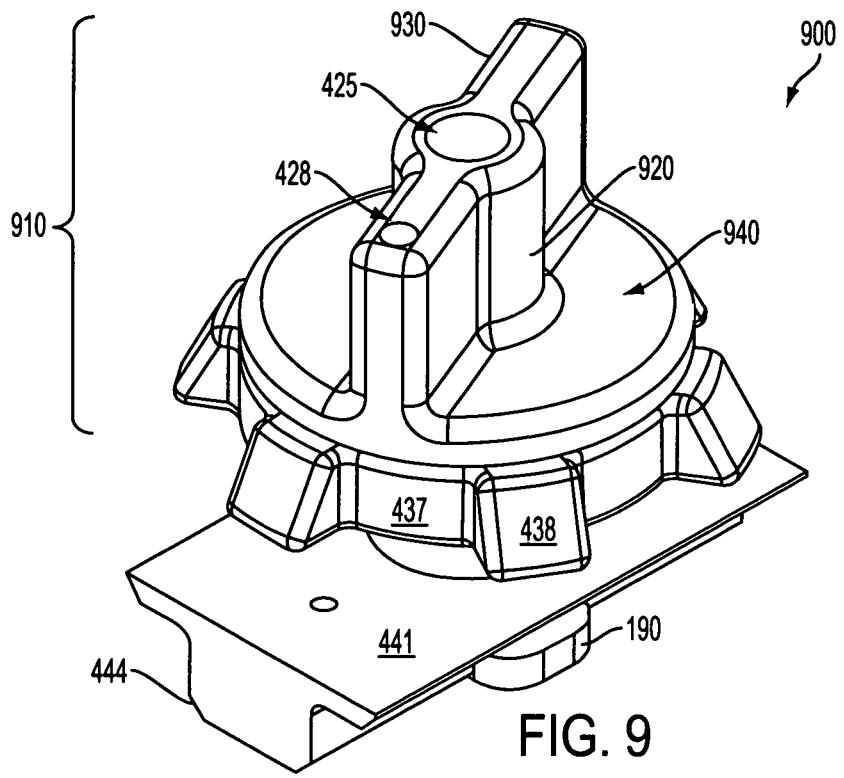
FIG. 9 is an isometric assembly view of an alternate fastener embodiment.
Figure 10:
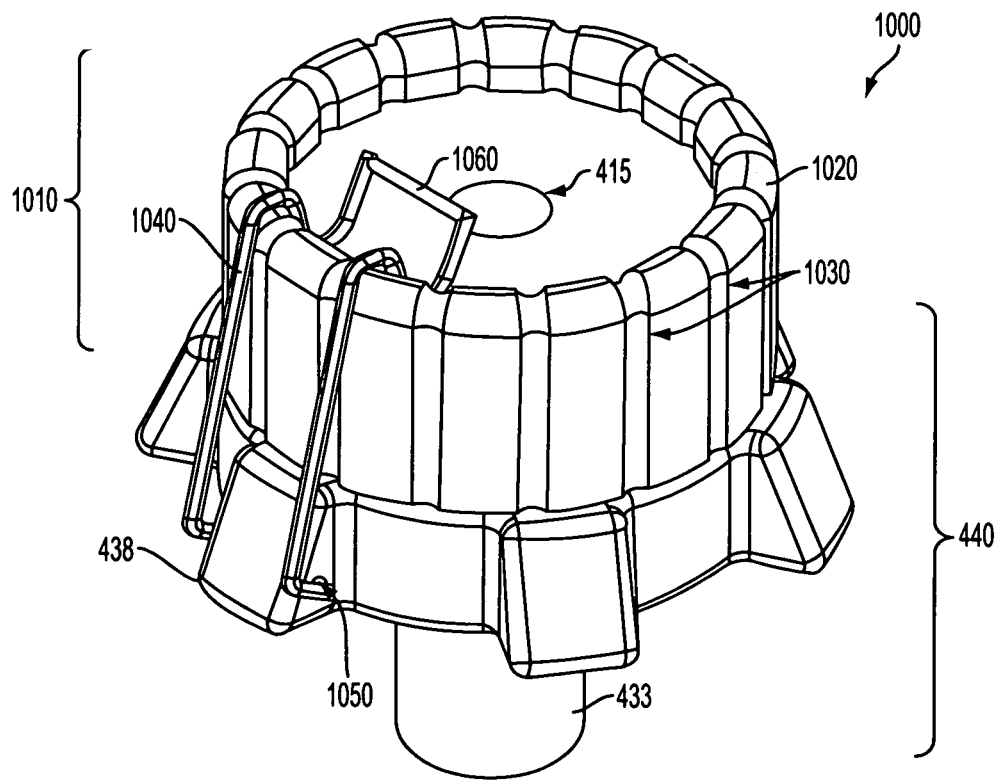
FIG. 10 is an isometric subassembly view of the knob for another alternate fastener.

FIGS. 9 and 10 illustrate alternate embodiments to the fastener 100. For example, FIG. 9 shows an isometric view 900 of an exemplary lid 910 atop the grip 140. A cylindrical member 920 extends axially outward above the grip 140 flanked by radially extending bars 930 that form a straight handle disposed on an upper surface 940 of the grip 140. The flange 190 is depicted as nestled within the linear notch 445. The bars 930 provide an easy-to-grasp handle for turning the lid 910.

FIG. 10 shows an isometric view 1000 of an exemplary cap 1010 disposed on a grip assembly 440 in which the detent 420 and accompanying orifices are replaced with external clip locks to prevent inadvertent disengagement. The cap 1010 includes a periphery 1020 having a rounded circumferential edge, with distributed grooves 1030. An over-the-top clip 1040 engages within adjacent grooves 1030 and hinges onto one of the wings 438 below the cap 1010 and at torsion link 1060 above the cap 1010. Artisans of ordinary skill will recognize that techniques to secure the knob assembly 430 to the base assembly 440 can be accomplished by other mechanisms, such as lock washers, cotter pins, etc., without departing from the scope of the invention.

For various exemplary embodiments the grip 140 of the base assembly 440 inserts into the base assembly 440 within which to rotate 90° to engage and disengage with the strut 210. The stop insert 425 inserts into the grip 140 and engages the flat surface 810 against a corresponding surface 455 on the stud 170. This transfers the rotation of the grip 140 to the stud 170, enabling the fastener 100 to engage and disengage with the strut 210.

This configuration represents a mechanism to accomplish the process, and that depending on construction can be manufactured as a unitary component. The cap 130 can be threaded to accept the stud 170 and tighten the stud 170 to lock the fastener 100 to the strut 210. To prevent accidental loosening, the detent 420 can be installed in the cap 130 and provides a friction-spring lock that engages the grip 140 while the cap 130 remains tight.

The spring 180 is uncompressed while the grip assembly 430 remains flaccid, and compressed when the grip assembly 430 has been tightened in locking position. This condition holds tension against the cap 130 and the grip 140 to prevent inadvertent loosening.

Several features have been designed into the assembly to make operation simple and effective. The tab 720, which extends 90° on the bottom surface 710 of the grip 140, engages the annular notch 447 that is cut 180° on the top of the annulus 150 to permit the grip to turn up to 90° by hand. This enables the grip 140 to rotate a maximum of 90° so as to engage and disengage the fastener 100 within the strut 210. Additionally, the boss 444 also includes the linear notch 445 such that, when tightened, the flange 190 cannot rotate and disengage the strut 210, even if tension is removed from the mating surfaces.

The device can be constructed from a variety of materials depending on load and application in accordance with good engineering practices. For the purpose of prototyping, a prototype configuration has been constructed out of a combination of aluminum and stainless steel for handling a load of approximately 50-lbf each in an extreme environment.

For lighter loads in less harsh environments, lighter-duty materials such as plastics or other metals could be used to reduce weight and/or cost. The shape and size of the knobs can vary based on load and human systems interfacing needs, such as shown in view 900 with flat sides for easy gripping.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A fastener for attaching to a structure having opposing edges that flank a cavity across a gap, said fastener comprising:

a knob assembly having a grip and an annular shaft disposed thereon along an axis of symmetry, said grip having a central through-hole coaxial with said annular shaft, said annular shaft having an arc tab that radially protrudes therefrom;

a base assembly for engaging said knob assembly, said base assembly including a clamp and an outer key-annulus disposed thereon, the clamp having first and second dimensions perpendicular to said axis, said first dimension being shorter than the gap, said base assembly being flanked by opposing ledges along said second dimension, each ledge arranged to engage a respective edge of the structure, said outer key-annulus having an annular notch opposite said clamp, said annular shaft being coaxially insertable into said outer key-annulus; and a latch member for engaging said base assembly, said latch member including a stud and a flange, said stud being insertable at a proximal end into said annular shaft and said through-hole, said flange being disposed at a distal end of said stud and having a third dimension shorter than the gap, said flange and said block being insertable into the cavity along said respective third and first dimensions through the gap, responsive to clockwise turning, said grip rotates said tab within said angular notch until inhibited by said outer key-annulus, whereby said proximal end of said stud retracts into said through-hole, thereby engaging the fastener to the structure, said through-hole including a flat wall parallel to said axis, said stud having a truncation surface at said proximal end, said truncation surface engaging said wall in response to retraction of said stud into said through-hole, and said wall forming by a linear insert that fills a corresponding linear slot within said knob assembly, said slot extending through a surface substantially perpendicular to said axis.

2. The fastener according to claim 1, wherein said clamp includes a linear notch midway across said first dimension, and said flange aligns said third dimension into said linear notch in response to retraction of said stud into said through-hole.

3. The fastener according to claim 1, wherein said grip and said clamp engage at counterpart surfaces as said annular shaft inserts into said outer key-annulus.

4. The fastener according to claim 1, further including a cap member that engages said grip, said cap member having a locking mechanism for securing said base assembly.

5. The fastener according to claim 4, wherein said cap member includes a spring-loaded ball detent that engages a peripheral cavity on a surface of said knob assembly, said surface being substantially perpendicular to said axis.

6. The fastener according to claim 1, further including a helical spring around said stud to provide tension between said flange and said-clamp.

7. The fastener according to claim 1, wherein said grip being turned counter-clockwise rotates said tab within said angular notch to disengage the fastener from the structure.

8. The fastener according to claim 1, wherein said tab extends 90° and said angular notch extends 180°.

9. A fastener for attaching to a structure having opposing edges that flank a cavity across a gap, said fastener comprising:

a knob assembly having a grip and an inner annulus annular shaft disposed thereon along an axis of symmetry, said grip having a central through-hole coaxial with said inner annulus annular shaft, said inner annulus annular shaft having an arc tab that radially protrudes therefrom;

a base assembly for engaging said knob assembly, said base assembly including a boss clamp and an outer key-annulus disposed thereon, the boss clamp having first and second dimensions perpendicular to said axis, said first dimension being shorter than the gap, said base assembly being flanked by opposing ledges along said second dimension, each ledge arranged to engage a respective edge of the structure, said outer key-annulus having an annular notch opposite said clamp, said inner annulus annular shaft being coaxially insertable into said outer key-annulus;

a latch member for engaging said base assembly, said latch member including a stud and a flange, said stud being insertable at a proximal end into inner annulus annular shaft and said through-hole, said flange being disposed at a distal end of said stud and having a third dimension shorter than the gap; and a cap member that engages said grip, said cap member having a circumferential rim and locking mechanism for securing said base assembly, said flange and said block being insertable into the cavity along said respective third and first dimensions through the gap, and responsive to clockwise turning, said grip rotates said tab within said angular notch until inhibited by said outer key-annulus, whereby said proximal end of said stud retracts into said through-hole, thereby engaging the fastener to the structure, wherein said locking mechanism includes a clip that engages a portion of said circumferential rim.

10. A fastener for attaching to a structure having opposing edges that flank a longitudinal cavity along a gap, said fastener comprising:

a knob assembly having a circumferential rim about an axis of symmetry that bounds first and second surfaces substantially perpendicular to said axis, and an annular shaft that extends from said second surface along said axis, said first surface having a central cavity that includes a flat wall parallel to said axis, said central cavity being continuous with and coaxial to said annular shaft and angularly truncated by said wall, said second surface having an arc tab that protrudes radially outward from said annular shaft;

a base assembly for engaging said knob assembly, said base assembly having a block and an outer key-annulus, said block having a boss and a platform, said boss having first and second pairs of sides substantially parallel to said axis and each pair of sides being perpendicular to each other, said first pair having a first linear dimension shorter than the gap, said second side having a linear notch, said platform having a third surface that axially bounds said first and second pairs and from which said outer key-annulus axially extends, each side of said second pair having a ledge opposite said third surface, said outer key-annulus having an angular notch opposite said third surface, said annular shaft being insertable into said outer key-annulus; and a latch member for engaging said base assembly, said latch member having a stud and a flange, said stud being substantially cylindrical about said axis between proximal and distal ends, said flange being disposed at said distal end of said stud and having a third linear dimension shorter than the gap, said stud having a truncation surface at said proximal end, said stud being insertable at said proximal end through said linear notch into said annular shaft;

said flange and said block being insertable into the longitudinal cavity along said respective third and first linear dimensions through the gap between the edges, and responsive to clockwise turning, said rim rotates said tab within said angular notch until said outer key-annulus inhibits said tab and said truncation surface engages said wall, whereby said proximal end of said stud retracts into said central cavity and said flange aligns for insertion into said linear notch, thereby engaging the fastener to the structure.

11. The fastener according to claim 10, further including a cap member that engages said knob assembly, said cap member having a locking mechanism for securing said base assembly, said cap member being coaxial with said knob assembly.

12. The fastener according to claim 11, wherein said cap member includes a spring-loaded ball detent that engages a peripheral cavity on said first surface.

13. The fastener according to claim 11, wherein said cap member includes a clip that engages a portion of said circumferential rim.

14. The fastener according to claim 10, further including a helical spring around said stud to provide tension between said flange and said boss.

15. The fastener according to claim 10, wherein said wall forms by a linear insert that fills a corresponding linear slot within said first surface.

16. The fastener according to claim 10, wherein said rim being turned counter-clockwise rotates said tab within said angular notch to disengage the fastener from the structure.

17. The fastener according to claim 10, wherein said tab extends 90° and said angular notch extends 180°.

\* \* \* \* \*